Nov. 17, 1925.  1,562,122
J. R. OISHEI
FLUID PRESSURE MOTOR
Original Filed Oct. 24, 1921   2 Sheets-Sheet 1

INVENTOR
John R. Oishei
by Parker & Prochnow,
ATTORNEYS.

Nov. 17, 1925.  
J. R. OISHEI  
1,562,122  
FLUID PRESSURE MOTOR  
Original Filed Oct. 24, 1921  
2 Sheets-Sheet 2
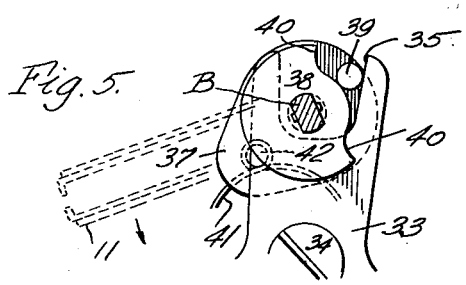
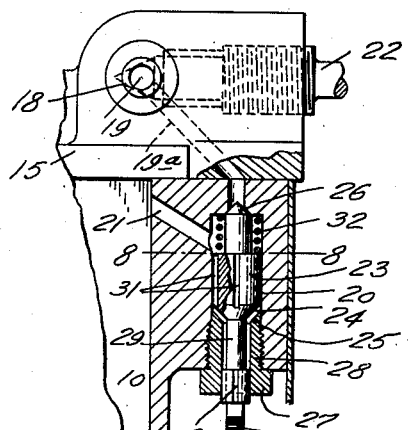
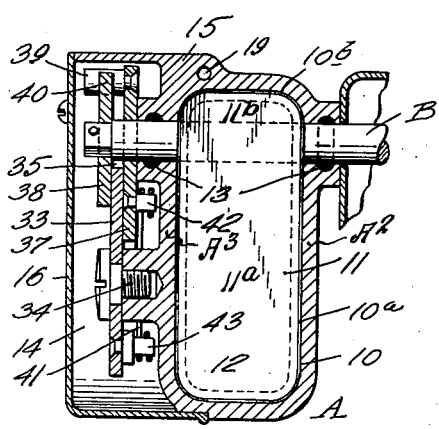
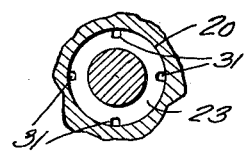
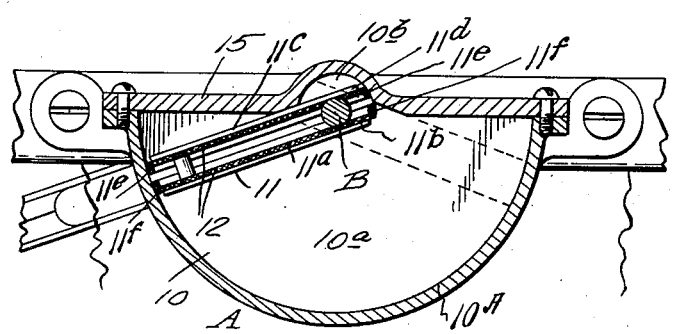
INVENTOR  
John R. Oishei  
by Parker & Brockwow  
ATTORNEYS.

Patented Nov. 17, 1925.

1,562,122

UNITED STATES PATENT OFFICE.

JOHN R. OISHEI, OF BUFFALO, NEW YORK.

FLUID-PRESSURE MOTOR.

Original application filed November 24, 1921, Serial No. 509,822. Divided and this application filed February 8, 1923. Serial No. 617,873.

*To all whom it may concern:*

Be it known that I, JOHN R. OISHEI, a citizen of the United States, residing at Buffalo, in the county of Erie and State of New York, have invented a new and useful Improvement in Fluid-Pressure Motors, of which the following is a specification.

This invention relates to motors and more particularly to motors of the fluid pressure type.

The present application is a division of my application Serial No. 509,822, filed October 24, 1921.

The objects of the invention are to produce a strong and durable fluid pressure motor which is not liable to get out of order; also to produce a motor in which the operating mechanism is compact and small and which will operate on relatively low pressures; also to provide a fluid pressure motor with an improved controlling valve mechanism; and further, to provide improvements in fluid pressure motors in the other respects hereinafter set forth and claimed.

Fig. 5 is a portion of a sectional elevation thereof showing certain of the parts in still another position.

Fig. 6 is a cross section on line 6—6, Fig. 3, on an enlarged scale.

Fig. 7 is a sectional elevation thereof on line 7—7, Fig. 2.

Fig. 8 is an enlarged horizontal section through one of the valve chambers, on line 8—8, Fig. 6.

Fig. 9 is a sectional view of the piston chamber thereof.

Figure 1:
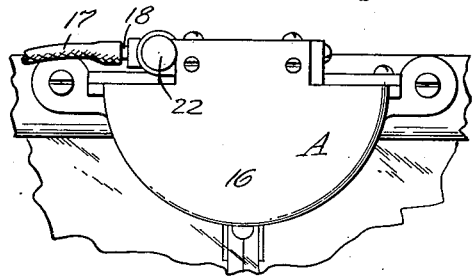
Fig. 1 is a face view of a motor embodying the invention.
Figure 2:
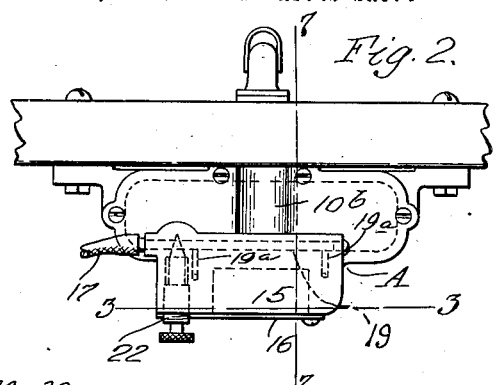
Fig. 2 is a top plan view thereof.

In the embodiment of the invention shown, A designates a motor casing which is preferably provided with a fluid pressure chamber 10. B designates a driven shaft journalled in the casing and the casing is preferably divided on the plane of the axis of the shaft B to facilitate the assembling of the parts therein. The fluid pressure chamber is preferably shaped so as to provide two portions $10^a$ and $10^b$, each of substantially segmental circular shape in a vertical plane and of different diameters. The peripheral walls of these portions are preferably rounded transversely. The rock shaft B is preferably concentric with the two segmental portions of the fluid chamber and carries a vane 11 located and adapted to swing in the chamber 10. This vane corresponds in shape with the cross sectional shape of the chamber 10, its opposite ends fitting the two portions $10^a$ and $10^b$ of the chamber, and is adapted to be swung in the chamber by pneumatic pressure. The vane has a pressure receiving portion of given area at one side of the rock shaft and a pressure receiving portion of lesser area at the opposite side of the rock shaft, the pressure receiving portions at opposite sides of the rock shaft being in the same fluid pressure chamber. The vane can be packed to give it a fit in the chamber and insure positive movement of the piston by the pneumatic pressure, in suitable manner, as for instance by packing disks secured to the opposite inner faces of the vane. The described shape of the vane and its chamber lends itself readily to proper packing of the vane since it enables the use of cupped leather packing disks 12 and there are no corners or angles which are hard to pack and apt to leak. The edges of the packing disks extend inwardly toward each other continuously around the vane as indicated at $11^e$ and $11^f$ and provide flanged edges extending continuously around the edges of the vane and contact with the chamber. The bearing openings for the rock shaft B can be packed by suitable packing rings or material 13 surrounding the rock shaft at opposite sides of the vane. The casing preferably further includes a valve housing or chamber 14 located behind the pressure chamber. As preferably constructed, the casing includes a main body portion and a removable top portion 15 bolted or otherwise suitably secured on the body portion. The body portion is formed as an open top chamber having opposite ends $A^2$ and $A^3$ and the vane or piston is not bodily movable but swings parallel with and is at all times in contact with the ends of the casing which has a continuous curved side $10^A$. As illustrated, a removable rear or cover plate 16 may be provided outside of the casing to form the valve chamber 14. As best illustrated in Fig. 9, the parts are so arranged that the vane has pressure receiving portions of given area $11^a$ at one side of its pivot and pressure receiving portions $11^b$ of lesser area at opposite sides of its pivot.

Pneumatic pressure for operating the vane and driven shaft is preferably provided in the following manner: 17 represents a flexible tube or other suitable pipe which is connected to the intake manifold of an automobile engine, or other means for producing a suction or partial vacuum, and is attached as by a nipple 18 to the motor casing A. This nipple is connected by a suction passage 19 and branches 19ª thereof in the motor casing, see Figs. 3 and 4, to two valve chambers 20 and 20ª which in turn are connected by ports 21 and 21ª with the chamber 10 at opposite sides of the vane. Preferably a screw needle valve 22 is provided which is adapted to be adjusted toward and from a seat in the passage 19 for regulating and shutting off the flow of air through this passage to thereby control, as desired, the operation of, or stop the motor, as hereinafter explained. Atmospheric air is first admitted to one side of the vane and applied simultaneously to the unequal area pressure receiving portions 11ᶜ and 11ᵈ at opposite sides of the shaft B and the air is withdrawn from the reverse side of the vane connecting with the suction passage 19, and then atmospheric air is admitted to the last-mentioned side of the vane and applied simultaneously to the unequal area pressure receiving portions 11ª and 11ᵇ, and the first-mentioned side of the vane chamber placed in communication with the suction passage 19, to produce motion of the vane 11, by suitable valves and valve-actuating mechanism preferably constructed as follows:

23 and 23ª represent two valves located in the valve chambers 20 and 20ª respectively. Each of these valves, see Fig. 6, has a conical face 24 adapted to engage a correspondingly shaped outer seat 25 in the valve chamber, and a conical upper or inner end adapted to engage a corresponding shaped seat 26 at the inner end of the valve chamber. The outer seat 25 is conveniently formed on the inner end of a threaded plug 27 which is screwed into the outer end of the valve chamber and has a longitudinal hole 28 through it by which atmospheric air pressure is admitted to the valve chamber. The valve can be inserted into or removed from the valve chamber or its position with relation to the valve seats adjusted by moving the screw plug 27. Each valve is provided with a stem 29 extending through the hole 28. The valve stem and its hole 28 can be of any appropriate shape to permit the passage of air through the hole around the valve stem when the valve is moved inwardly off of the outer seat 25. As shown, the valve stems are provided with small longitudinal grooves 30. The body of each valve is also shown as grooved at 31 to permit flow of air from the hole 28 to the port 21. Each valve is provided with a spring 32 which tends to seat the valve on its outer seat 25 and resists movement of the valve towards its inner seat. The spring 32 may be of any desirable size and strength and may be adjusted by screwing plug 27 in or out more or less as is necessary or desirable, so as to resist to a desired extent any force or forces tending to seat the valve on its inner seat. When the valves are in the position shown in Fig. 3, with the valve 23 on its inner seat and the valve 23ª on its outer seat, the right hand side of the vane chamber is connected with the suction passage 19 through the passage 21ª and valve chamber 20ª. The other valve 23 being seated against its inner seat shuts off communication between the left hand side of the vane chamber and the suction passage 19 and admits atmospheric pressure through the adjacent admission openings 28, valve chamber 20 and passage 21 to the left hand side of the vane chamber. The vane thereupon swings counter-clockwise and the positions of the valves are reversed to cause opposite or clockwise swinging of the vane.

Means are provided for rocking or actuating the valves. In the embodiment of the invention shown, 33 represents a valve actuating rocker or oscillating member preferably pivoted at its lower end on a suitable stud or pivot 34. This rocker 33 is provided in its upper portion with an opening 35 or bifurcated part through which the rock shaft B passes and which permits the rocker to move on its pivot 34 from the inclined position shown in Fig. 3 to the oppositely inclined position shown in Fig. 4. The rocker is provided with lateral arms 36 and 36ª arranged to strike the stems of the valves 23 and 23ª respectively for shifting the valves from their outer to their inner seats. When the vane swings in the chamber, it operates through suitable means, such for example as the mechanism presently described, to swing the rocker 33 from one to the other of its inclined positions for shifting the valves to reverse the swing of the vane. In order to insure a quick, positive movement of the valves, the rocker is preferably acted upon by a spring which acts when the rocker 33 has been moved beyond a central position in either direction to then quickly and positively complete the movement of the rocker and the reversing of the valves. The spring mechanism shown for this purpose is as follows:—37 indicates a plate or spring-stressing member which is loosely pivoted on the rock shaft B at one side of the rocker 33, and 38 indicates a plate at the opposite side of the rocker, fixed on the rock shaft in any suitable way to rock therewith. The loose plate 37 has a stud 39 thereon which projects between and is adapted to be struck by two shoulders or projections 40 on the fixed plate 38. A spring 41 connects the loose plate and the rocker 33, this spring being preferably a spring wire having its middle portion coiled around a stud 42 on the loose plate and having its opposite bowed legs or halves attached at their ends to a stud 43 on the lower end of the rocker 33 below the rocker pivot. When the vane 11 and rock shaft B move in one direction, one of the shoulders 40 on the fixed plate 38 will engage the stud 39 and swing the loose plate 37 in the same direction and compress or stress the spring 41 until the spring stud 42 passes a central position in a line connecting the axes of the rock shaft B and the pivot 34 of the rocker 33. Then the spring 41 will act to throw the rocker 33 quickly over to its other inclined position and reverse the positions of the valves 23 and 23$^a$ before the vane fully reaches the limit of its swing, so that the valves are in position to cause immediate reversal of vane. In the opposite swing of the vane the spring 41 acts in a similar manner to quickly throw the rocker 33 back to the initial position.

Figure 3:
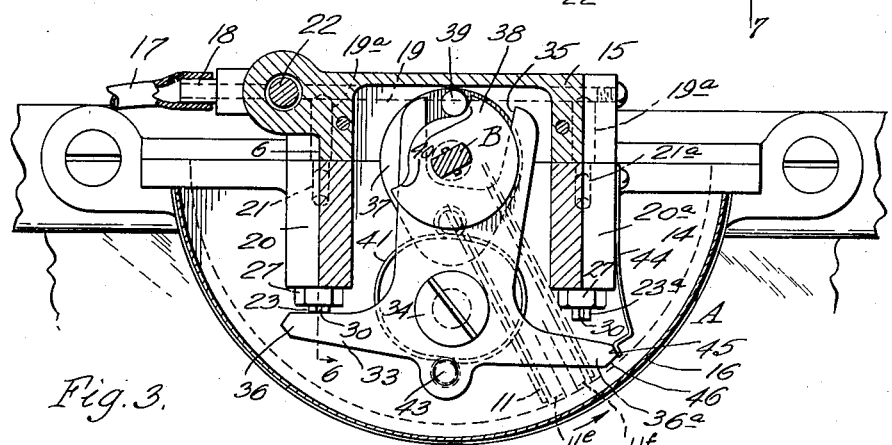
Fig. 3 is a sectional elevation thereof on line 3—3, Fig. 2.
Figure 4:
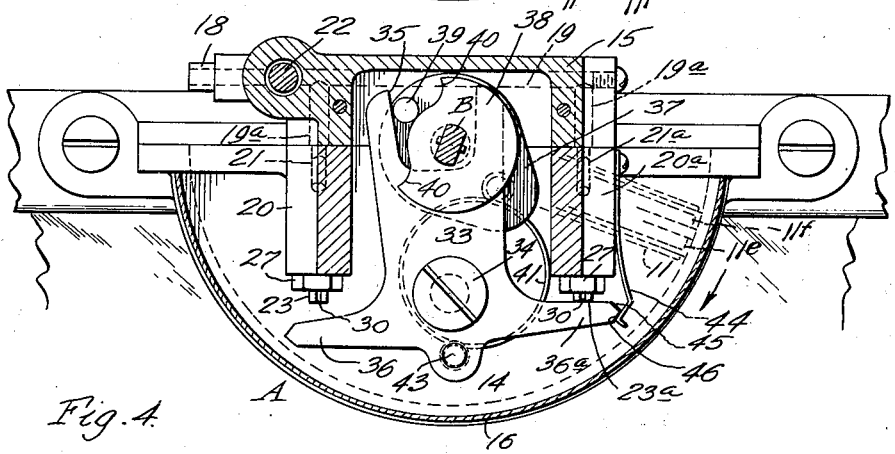
Fig. 4 is a similar view showing the parts in another position.

In the position of the parts shown in Fig. 3, the valve 23 is against its inner seat and the valve 23$^a$ against its outer seat. The right hand side of the vane chamber is then connected with the suction passage 19 and atmospheric air is permitted to pass the valve 23 and enter to the left hand side of the vane chamber through the port 21, thereby rotating the vane counter-clockwise. When the vane has rotated far enough for the spring 41 to throw the rocker 33 over to the other inclined position, the rocker will move the valve 23$^a$ against its inner seat 26 and release the valve 23 which will then be moved by the spring 32 against its outer seat 25. Atmospheric air will then enter past the valve 23$^a$ and pass through the port 21$^a$ to the right hand side of the vane chamber, and thereby cause a reverse or clockwise rotation of the vane, see Fig. 4. Fig. 5 shows the relative positions of the rocker 33 and plates 37 and 38 when the vane has completed its clockwise rotation and is about to start its counterclockwise rotation. Means may be provided for releasably holding the rocker in each of its opposite tilted positions. For this purpose, as shown, there may be provided a spring 44 secured in the valve housing 14 and having a bent portion adapted to engage oppositely inclined faces 45 and 46 at the end of one of the rocker arms, as 36$^a$. This spring prevents accidental movement of the rocker to an intermediate position, in which both valves 23 and 23$^a$ might occupy like positions and interfere with the proper starting of the motor.

I claim as my invention:

1. A fluid pressure motor having a fluid pressure chamber with concentric curved oppositely disposed inner wall portions of different radii extending from an axis between said opposite inner wall portions, a vane having a pair of packing portions with edges in contact with said wall portions the edges of said packing portions being bent inwardly toward each other, a rock shaft secured to said vane, the axis of said rock shaft coinciding with said first named axis, and means for controlling the admission of operating fluid to said chamber to move said vane.

2. In a fluid pressure motor the combination of a vane adapted to be acted upon by fluid pressure on either face, a rock shaft carrying and actuated by said vane, and a casing in which said vane fits and operates, said vane extending above and below said rock shaft and having fluid obstructing packing having flanged edges arranged continuously around all of its edge and over and around the sides of said shaft at the vane edge and contacting continuously with all sides and ends of the casing and said casing conforming interiorly to the edge of said vane.

3. A fluid pressure motor having a single pressure chamber with two concentric segmental circular peripheral portions of different radii extending from opposite sides of the axis of said peripheries, a swinging vane eccentrically pivoted by a rock shaft in said chamber on the axis of said peripheries and having on each working face pressure receiving portions at opposite sides of its pivot, one pressure receiving portion of each face being of greater area than the other pressure receiving portion of said face, means for subjecting the opposite pressure receiving portions of one face of said vane simultaneously to equal fluid pressures and withdrawing pressure from the pressure receiving portions of the other face, said vane having continuous packing portions extending in one piece from one of said peripheries to the other across and around said rock shaft and having continuous flanged edges contacting with both peripheries and ends of the chamber completely around the vane, whereby the vane is completely packed at its outer edges and across said rock shaft.

JOHN R. OISHEI.

Certificate of Correction.

It is hereby certified that in Letters Patent No. 1,562,122, granted November 17, 1925, upon the application of John R. Oishei, of Buffalo, New York, for an improvement in "Fluid-Pressure Motors," an error appears in the printed specification requiring correction as follows: Page 1, in the heading, line 5, original application filing date, for "November 24, 1921," read *October 24, 1921;* and that the said Letters Patent should be read with this correction therein that the same may conform to the record of the case in the Patent Ofice.

Signed and sealed this 5th day of October, A. D. 1926.

[SEAL.]

M. J. MOORE,
*Acting Commissioner of Patents.*